United States Patent
Bendall

(10) Patent No.: US 9,013,469 B2
(45) Date of Patent: Apr. 21, 2015

(54) METHOD AND DEVICE FOR DISPLAYING A THREE-DIMENSIONAL VIEW OF THE SURFACE OF A VIEWED OBJECT

(75) Inventor: Clark Alexander Bendall, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 989 days.

(21) Appl. No.: 13/040,678

(22) Filed: Mar. 4, 2011

(65) Prior Publication Data

US 2012/0223937 A1    Sep. 6, 2012

(51) Int. Cl.
| | |
|---|---|
| *G06T 19/00* | (2011.01) |
| *G06T 17/00* | (2006.01) |
| *G06T 17/20* | (2006.01) |
| *G06T 7/60* | (2006.01) |
| *G06F 3/0481* | (2013.01) |
| *G06F 3/0484* | (2013.01) |
| *G01B 11/24* | (2006.01) |
| *G06T 7/00* | (2006.01) |

(52) U.S. Cl.
CPC ............. *G01B 11/24* (2013.01); *G06T 7/0002* (2013.01); *G06T 7/602* (2013.01); *G06T 2207/10028* (2013.01); *G06T 2207/10068* (2013.01)

(58) Field of Classification Search
CPC ......... G06T 19/00; G06T 17/20; G06T 17/00; G06F 3/04815; G06F 3/04842
USPC .................................. 345/419; 715/852
See application file for complete search history.

(56) References Cited

U.S. PATENT DOCUMENTS

| | | | |
|---|---|---|---|
| 6,083,162 | A | 7/2000 | Vining |
| 6,459,481 | B1 | 10/2002 | Schaack |
| 7,030,996 | B2 | 4/2006 | De Groot et al. |
| 7,570,363 | B2 | 8/2009 | Takahashi |
| 2006/0150124 | A1 | 7/2006 | Hornegger et al. |
| 2006/0232583 | A1* | 10/2006 | Petrov et al. .................. 345/419 |
| 2009/0225321 | A1 | 9/2009 | Bendall et al. |
| 2009/0225329 | A1 | 9/2009 | Bendall et al. |
| 2009/0225333 | A1 | 9/2009 | Bendall et al. |

FOREIGN PATENT DOCUMENTS

| | | |
|---|---|---|
| GB | 2328280 A | 2/1999 |
| WO | WO-2006056614 A1 | 6/2006 |
| WO | 2010107434 A1 | 9/2010 |

OTHER PUBLICATIONS

Search Report and Written Opinion from EP Application No. 12157924.7 dated Jun. 22, 2012.

\* cited by examiner

*Primary Examiner* — Xiao M. Wu
*Assistant Examiner* — Matthew D Salvucci
(74) *Attorney, Agent, or Firm* — Hiscock & Barclay LLP

(57) ABSTRACT

A method and device for displaying a three-dimensional view of the surface of a viewed object is disclosed, wherein a subset of the three-dimensional data from the entire image of the viewed object in a region of interest is determined and displayed to provide enhanced detail in the region of interest.

17 Claims, 4 Drawing Sheets

METHOD AND DEVICE FOR DISPLAYING A THREE-DIMENSIONAL VIEW OF THE SURFACE OF A VIEWED OBJECT

BACKGROUND OF THE INVENTION

The subject matter disclosed herein relates to a method and device for displaying a three-dimensional view of the surface of a viewed object.

Video inspection devices, such as video endoscopes, can be used to inspect the surface of a viewed object to identify and analyze irregularity on that surface that may have resulted from damage or wear of the object. In many instances, the surface is inaccessible and cannot be viewed without the use of the video inspection device. For example, a video endoscope can be used to inspect the surface of a blade of a turbine engine on an aircraft or power generation unit to identify any irregularities that may have formed on the surface to determine if any repair or further maintenance is required. In order to make that assessment, it is often necessary to obtain highly accurate dimensional measurements of the surface and the irregularity to verify that the irregularity does not exceed or fall outside an operational limit or required specification for that object.

In order to determine the dimensions of an irregularity on the surface, a video inspection device can be used to obtain and display a two-dimensional image of the surface of a viewed object showing the irregularity. This two-dimensional image of the surface can be used to generate three-dimensional data (e.g., in the form of a map) of the surface that provides the three-dimensional coordinates (e.g., (x, y, z)) of a plurality of points on the surface, including in a region of interest on the surface (e.g., proximate an irregularity). In some video inspection devices, the operator can operate the video inspection device in a measurement mode to enter a measurement screen in which the operator places cursors on the two-dimensional image in the region of interest to determine geometric dimensions of the irregularity. In many instances, the contour of a viewed feature is difficult to assess from the two-dimensional image, making highly accurate placement of the cursors in the region of interest difficult. For example, when trying to measure the depth of a dent or pit, it may be difficult to determine, from the two-dimensional image, the location of the deepest point in the pit or dent.

In order to provide the operator with additional information about the region of interest, some video inspection devices offer a point cloud view, which is a rendered three-dimensional surface model of the viewed object in the image that can be maneuvered (e.g., rotated, zoomed, panned, etc.) about the origin of the field of view of the video inspection device, which is typically proximate the tip of the probe. When the region of interest is relatively small in comparison to the full image of the surface, or when the region of interest is far from the origin of the field of view, the point cloud view of the full image is not always effective in providing the required level of detail of the region of interest. In those instances, the point cloud view of the full image may lack sufficient detail and can become unwieldy as it is maneuvered about the origin of the field of view as the majority of three-dimensional data is irrelevant to the region of interest, which can be relatively far from the tip of the probe.

Another technique employed by some video inspection devices is the use of a point cloud view in which the three-dimensional surface model is colorized to form a depth map color scale. In the colorized point cloud view, each color is associated with the distance from the tip of the probe rather than using, e.g., two-dimensional image information associated with each point on the surface. This colorized rendering of the point cloud view of the full image makes it difficult to inspect small details in the region of interest due to the large area and range covered by the entire view. Therefore, there is a need to provide enhanced detail in the region of interest to enable more accurate inspections and measurements.

The discussion above is merely provided for general background information and is not intended to be used as an aid in determining the scope of the claimed subject matter.

BRIEF DESCRIPTION OF THE INVENTION

A method and device for displaying a three-dimensional view of the surface of a viewed object is disclosed, wherein a subset of the three-dimensional data from the entire image of the viewed object in a region of interest is determined and displayed to provide enhanced detail in the region of interest. An advantage that may be realized in the practice of some disclosed embodiments of the method and device is more accurate inspections and measurements.

In one exemplary embodiment, a method for displaying a three-dimensional view of the surface of a viewed object is disclosed. The method comprises the steps of obtaining and displaying an image of the surface of the viewed object, determining the three-dimensional coordinates in a first coordinate system of a plurality of surface points on the surface of the viewed object, selecting a plurality of measurement points on the surface of the viewed object, determining a reference surface based on the three-dimensional coordinates in the first coordinate system of three or more of the plurality of surface points proximate one or more of the plurality of measurement points, establishing a second coordinate system different from the first coordinate system based on the reference surface and the plurality of measurement points, transforming the three-dimensional coordinates in the first coordinate system of the plurality of surface points to the three-dimensional coordinates in the second coordinate system, determining a subset of the plurality of surface points that are within a region of interest on the surface of the viewed object, wherein the region of interest is based on the plurality of measurement points, and displaying a rendered three-dimensional view of the subset of the plurality of surface points in the three-dimensional coordinates of the second coordinate system.

In another exemplary embodiment, the method for displaying a three-dimensional view of the surface of a viewed object comprises the steps of obtaining and displaying an image of the surface of the viewed object, determining the three-dimensional coordinates in a first coordinate system of a plurality of surface points on the surface of the viewed object, selecting a plurality of measurement points on the surface of the viewed object, determining a subset of the plurality of surface points based on the locations of the plurality of measurement points, displaying a rendered three-dimensional view of the subset of the plurality of surface points, and displaying the plurality of measurement points in the rendered three-dimensional view.

In yet another exemplary embodiment, a device for displaying a three-dimensional view of the surface of a viewed object is disclosed. The device comprises an imager for obtaining an image of the surface of the viewed object, a monitor for displaying an image of the surface of the viewed object, a pointing device for selecting a plurality of measurement points on the surface of the viewed object, a central processor unit for determining the three-dimensional coordinates in a first coordinate system of a plurality of surface points on the surface of the viewed object, determining a reference surface based on the three-dimensional coordinates in the first coordinate system of three or more of the plurality of surface points proximate one or more of the plurality of measurement points, establishing a second coordinate system different from the first coordinate system based on the reference surface and the plurality of measurement points, transforming the three-dimensional coordinates in the first coordinate system of the plurality of surface points to the three-dimensional coordinates in the second coordinate system, and determining a subset of the plurality of surface points that are within a region of interest on the surface of the viewed object, wherein the region of interest is based on the plurality of measurement points, and displaying a rendered three-dimensional view of the subset of the plurality of surface points in the three-dimensional coordinates of the second coordinate system.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

A method and device for displaying a three-dimensional view of the surface of a viewed object is disclosed, wherein a subset of the three-dimensional data from the entire image of the viewed object in a region of interest is determined and displayed to provide enhanced detail in the region of interest. An advantage that may be realized in the practice of some disclosed embodiments of the method and device is more accurate inspections and measurements.

Figure 1:
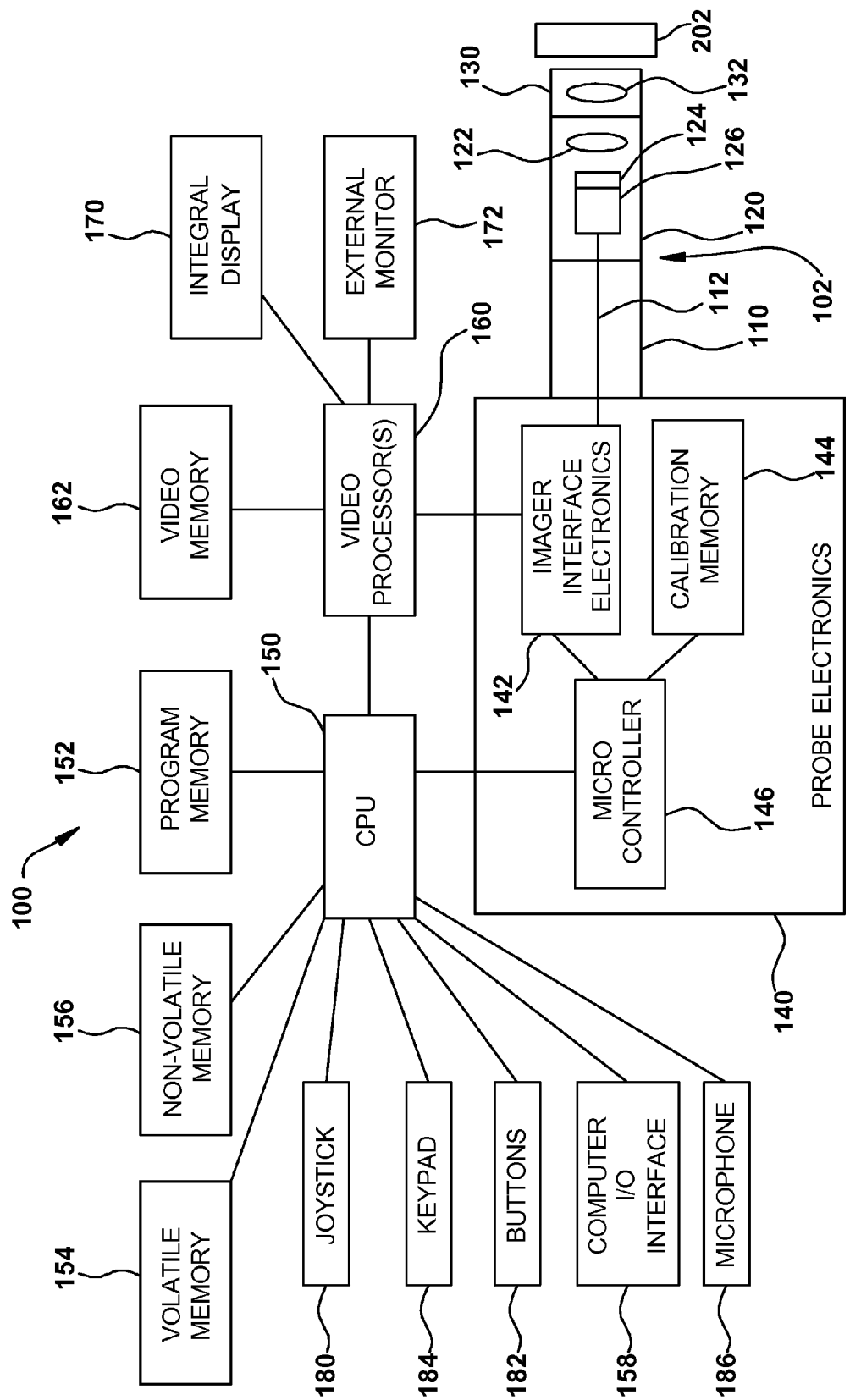
FIG. 1 is a block diagram of a video inspection device in an exemplary embodiment of the invention.

FIG. 1 is a block diagram of a video inspection device 100 in an exemplary embodiment of the invention. It will be understood that the video inspection device 100 shown in FIG. 1 is exemplary and that the scope of the invention is not limited to any particular video inspection device 100 or any particular configuration of components within a video inspection device 100.

Video inspection device 100 can include an elongated probe 102 comprising an insertion tube 110 and a head assembly 120 disposed at the distal end of the insertion tube 110. Insertion tube 110 can be a flexible, tubular section through which all interconnects between the head assembly 120 and probe electronics 140 are passed. Head assembly 120 can include probe optics 122 for guiding and focusing light from the viewed object 202 onto an imager 124. The probe optics 122 can comprise, e.g., a lens singlet or a lens having multiple components. The imager 124 can be a solid state CCD or CMOS image sensor for obtaining an image of the viewed object 202.

A detachable tip or adaptor 130 can be placed on the distal end of the head assembly 120. The detachable tip 130 can include tip viewing optics 132 (e.g., lenses, windows, or apertures) that work in conjunction with the probe optics 122 to guide and focus light from the viewed object 202 onto an imager 124. The detachable tip 130 can also include illumination LEDs (not shown) if the source of light for the video inspection device 100 emanates from the tip 130 or a light passing element (not shown) for passing light from the probe 102 to the viewed object 202. The tip 130 can also provide the ability for side viewing by including a waveguide (e.g., a prism) to turn the camera view and light output to the side. The tip 130 may also provide stereoscopic optics or structured-light projecting elements for use in determining three dimensional data of the viewed surface. The elements that can be included in the tip 130 can also be included in the probe 102 itself.

The imager 124 can include a plurality of pixels formed in a plurality of rows and columns and can generate image signals in the form of analog voltages representative of light incident on each pixel of the imager 124. The image signals can be propagated through imager hybrid 126, which provides electronics for signal buffering and conditioning, to an imager harness 112, which provides wires for control and video signals between the imager hybrid 126 and the imager interface electronics 142. The imager interface electronics 142 can include power supplies, a timing generator for generating imager clock signals, an analog front end for digitizing the imager video output signal, and a digital signal processor for processing the digitized imager video data into a more useful video format.

The imager interface electronics 142 are part of the probe electronics 140, which provide a collection of functions for operating the video inspection device 10. The probe electronics 140 can also include a calibration memory 144, which stores the calibration data for the probe 102 and/or tip 130. The microcontroller 146 can also be included in the probe electronics 140 for communicating with the imager interface electronics 142 to determine and set gain and exposure settings, storing and reading calibration data from the calibration memory 144, controlling the light delivered to the viewed object 202, and communicating with the CPU 150 of the video inspection device 10.

In addition to communicating with the microcontroller 146, the imager interface electronics 142 can also communicate with one or more video processors 160. The video processor 160 can receive a video signal from the imager interface electronics 142 and output signals to various monitors 170, 172, including an integral display 170 or an external monitor 172. The integral display 170 can be an LCD screen built into the video inspection device 100 for displaying various images or data (e.g., the image of the viewed object 202, menus, cursors, measurement results) to an inspector. The external monitor 172 can be a video monitor or computer-type monitor connected to the video inspection device 100 for displaying various images or data.

The video processor 160 can provide/receive commands, status information, streaming video, still video images, and graphical overlays to/from the CPU 150 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The CPU 150 can be used to manage the user interface by receiving input via a joystick 180, buttons 182, keypad 184, and/or microphone 186, in addition to providing a host of other functions, including image, video, and audio storage and recall functions, system control, and measurement processing. The joystick 180 can be manipulated by the operator to perform such operations as menu selection, cursor movement, slider adjustment, and articulation control of the probe 102, and may include a push-button function. The buttons 182 and/or keypad 184 also can be used for menu selection and providing user commands to the CPU 150 (e.g., freezing or saving a still image). The microphone 186 can be used by the inspector to provide voice instructions to freeze or save a still image.

The video processor 160 can also communicate with video memory 162, which is used by the video processor 160 for frame buffering and temporary holding of data during processing. The CPU 150 can also communicate with CPU program memory 152 for storage of programs executed by the CPU 150. In addition, the CPU 150 can be in communication with volatile memory 154 (e.g., RAM), and non-volatile memory 156 (e.g., flash memory device, a hard drive, a DVD, or an EPROM memory device). The non-volatile memory 156 is the primary storage for streaming video and still images.

The CPU 150 can also be in communication with a computer I/O interface 158, which provides various interfaces to peripheral devices and networks, such as USB, Firewire, Ethernet, audio I/O, and wireless transceivers. This computer I/O interface 158 can be used to save, recall, transmit, and/or receive still images, streaming video, or audio. For example, a USB "thumb drive" or CompactFlash memory card can be plugged into computer I/O interface 158. In addition, the video inspection device 100 can be configured to send frames of image data or streaming video data to an external computer or server. The video inspection device 100 can incorporate a TCP/IP communication protocol suite and can be incorporated in a wide area network including a plurality of local and remote computers, each of the computers also incorporating a TCP/IP communication protocol suite. With incorporation of TCP/IP protocol suite, the video inspection device 100 incorporates several transport layer protocols including TCP and UDP and several different layer protocols including HTTP and FTP.

Figure 2:
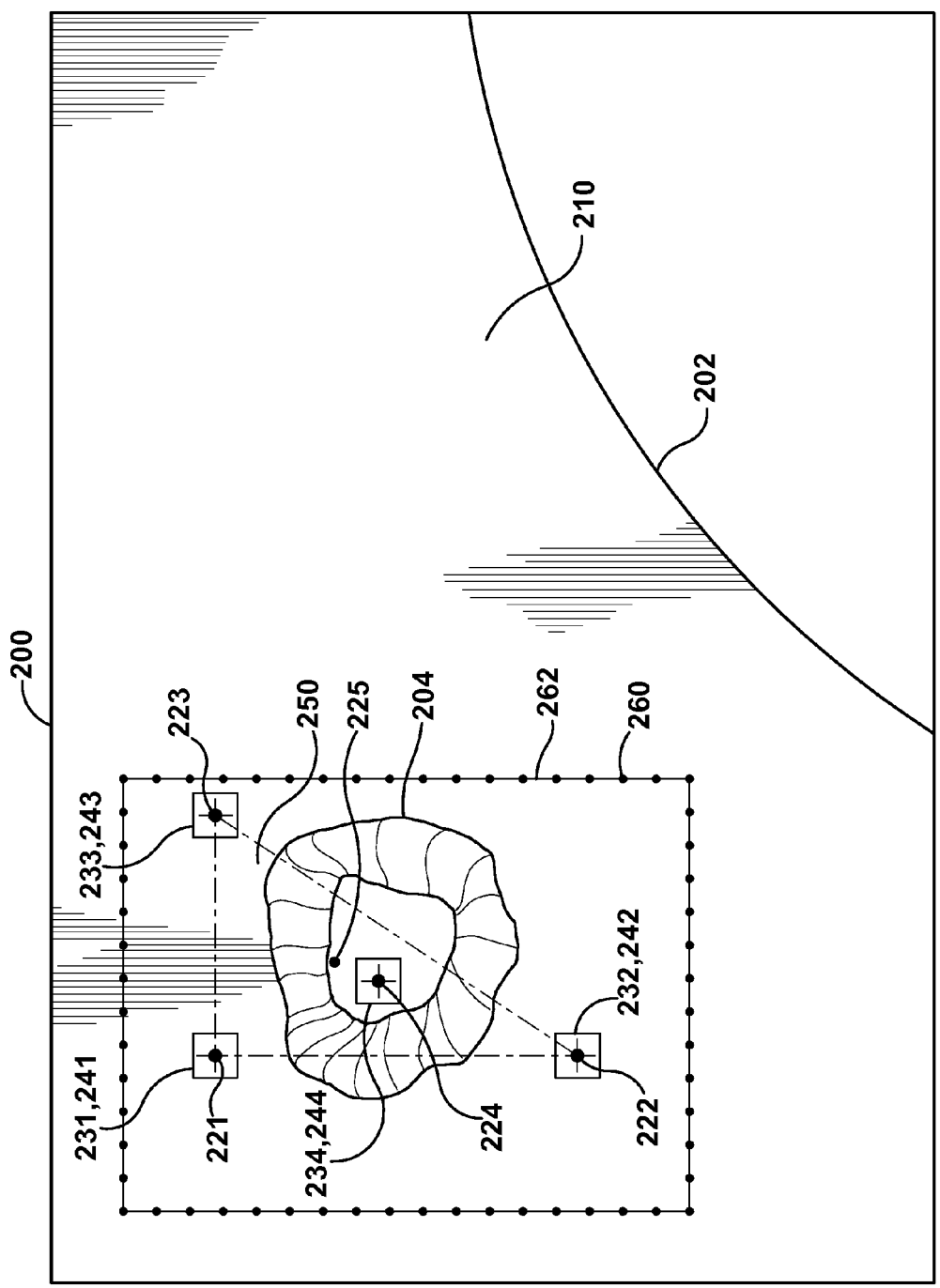
FIG. 2 is an image obtained by the video inspection device of the surface of a viewed object having an irregularity in an exemplary embodiment of the invention.

FIG. 2 is an image 200 obtained by the video inspection device 100 of the surface 210 of a viewed object 202 having an irregularity 204 in an exemplary embodiment of the invention. In this example, the irregularity 204 is shown as a dent, where material has been removed from the surface 210 of the viewed object 202 in the irregularity 204 by damage or wear. It will be understood that the irregularity 204 shown in this exemplary embodiment is just an example and that the inventive method applies to other types of irregularities (e.g., cracks, corrosion pitting, coating loss, surface deposits, etc.). Once the image 200 is obtained, and the irregularity 204 is identified, the image 200 can be used to determine the dimensions of the irregularity 204 (e.g., height or depth, length, width, area, volume, point to line, profile slice, etc.). In one embodiment, the image 200 used can be a two-dimensional image 200 of the surface 210 of the viewed object 202, including the irregularity 204.

Figure 3:
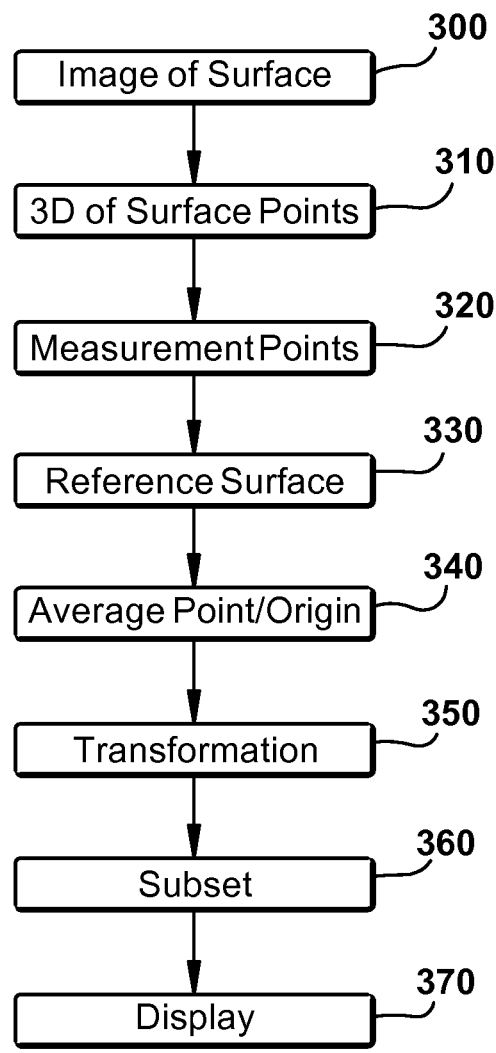
FIG. 3 is a flow diagram of a method for displaying three-dimensional data for inspection of the surface of the viewed object shown in the image of FIG. 2 in an exemplary embodiment of the invention.

FIG. 3 is a flow diagram of a method for displaying three-dimensional data for inspection of the surface 210 of the viewed object 202 shown in the image 200 of FIG. 2 in an exemplary embodiment of the invention. It will be understood that the steps described in the flow diagram of FIG. 3 can be performed in a different order than shown in the flow diagram and that not all of the steps are required for certain embodiments.

At step 300, and as shown in FIG. 2, the operator can use the video inspection device 100 to obtain an image 200 of the surface 210 of a viewed object 202 having an irregularity 204 and display it on a video monitor (e.g., an integral display 170 or external monitor 172).

At step 310, the CPU 150 of the video inspection device 100 can determine the three-dimensional coordinates ($x_{iS1}$, $y_{iS1}$, $z_{iS1}$) in a first coordinate system of a plurality of surface points on the surface 210 of the viewed object 202, including the irregularity 204. Several different existing techniques can be used to provide the three-dimensional coordinates of the points on the image 200 of the surface 210 (e.g., stereo, scanning systems, structured light methods such as phase shifting, phase shift moiré, laser dot projection, etc.). Most such techniques comprise the use of calibration data, which, among other things, includes optical characteristic data that is used to reduce errors in the three-dimensional coordinates that would otherwise be induced by optical distortions. With some techniques, the three-dimensional coordinates may be determined using one or more images captured in close time proximity that may include projected patterns and the like. It is to be understood that references to three-dimensional coordinates determined using image 200 may also comprise three-dimensional coordinates determined using one or a plurality of images 200 of the surface 210 captured in close time proximity, and that the image 200 displayed to the operator during the described operations may or may not actually be used in the determination of the three-dimensional coordinates.

At step 320, and as shown in FIG. 2, an operator can use the joystick 180 (or other pointing device (e.g., mouse, touch screen)) of the video inspection device 100 to select a plurality of measurement points on the surface 210 of the viewed object 202 proximate the irregularity 204 to conduct a particular type of measurement. The number of measurement points selected is dependent upon the type measurement to be conducted. Certain measurements can require selection of two measurement points (e.g., length, profile), while other measurements can require selection of three or more measurement points (e.g., point-to-line, area, multi-segment). In one embodiment and as shown in FIG. 2, a total of four measurement points 221, 222, 223, 224 are selected on the surface 210 of the viewed object 202 proximate the irregularity 204 to conduct a depth measurement of the irregularity 204, with three of the measurement points 221, 222, 223 selected on the surface 210 proximate the irregularity 204, and the fourth measurement point 224 selected to be at the deepest point of the irregularity 204. In one embodiment, the plurality of measurement points 221, 222, 223, 224 on the surface 210 of the viewed object 202 can be selected by placing cursors 231, 232, 233, 234 (or other pointing devices) on pixels 241, 242, 243, 244 of the image 200 corresponding to the plurality of measurement points 221, 222, 223, 224 on the surface 210. In the exemplary depth measurement, the video inspection device 100 can determine the three-dimensional coordinates in the first coordinate system of each of the plurality of measurement points 221, 222, 223, 224. It will be understood that the inventive method is not limited to depth measurements or measurements involving four selected measurement points, but instead applies to various types of measurements involving different numbers of points, including those discussed above.

At step 330, and as shown in FIG. 2, the CPU 150 of the video inspection device 100 can determine a reference surface 250. In some embodiments, the reference surface 250 can be flat, while in other embodiments the reference surface 250 can be curved. Similarly, in one embodiment, the reference surface 250 can be in the form of a plane, while in other embodiments, the reference surface 250 can be in the form of a different shape (e.g., cylinder, sphere, etc.). In the exemplary depth measurement of the irregularity 204 shown in FIG. 2, the three-dimensional coordinates of three or more surface points proximate one or more of the three measurement points 221, 222, 223 selected on the surface 210 proximate the irregularity 204 can be used to determine a reference surface 250 (e.g., a plane). In one embodiment, the video inspection device 100 can perform a curve fitting of the three-dimensional coordinates in the first coordinate system of the three measurement points 221, 222, 223 ($x_{iM1}$, $y_{iM1}$, $z_{iM1}$) to determine an equation for the reference surface 250 (e.g., for a plane) having the following form:

$$k_{0RS1} + k_{1RS1} x_{iRS1} + k_{2RS1} y_{iRS1} = z_{iRS1} \quad (1)$$

where ($x_{iRS1}$, $y_{iRS1}$, $z_{iRS1}$) are coordinates of any three dimensional point in the first coordinate system on the defined reference surface 250 and $k_{0RS1}$, $k_{1RS1}$, and $k_{2RS1}$ are coefficients obtained by a curve fitting of the three-dimensional coordinates in the first coordinate system.

It should be noted that a plurality of measurement points (i.e., at least as many points as the number of k coefficients) are used to perform the curve fitting. The curve fitting finds the k coefficients that give the best fit to the points used (e.g., least squares approach). The k coefficients then define the plane or other reference surface 250 that approximates the three-dimensional points used. However, if more points are used in the curve fitting than the number of k coefficients, when you insert the x and y coordinates of the points used into the plane equation (1), the z results will generally not exactly match the z coordinates of the points due to noise and any deviation from a plane that may actually exist. Thus, the $x_{iRS1}$ and $y_{iRS1}$ can be any arbitrary values, and the resulting $z_{iRS1}$ tells you the z of the defined plane at $x_{iRS1}$, $y_{iRS1}$. Accordingly, coordinates shown in these equations can be for arbitrary points exactly on the defined surface, not necessarily the points used in the fitting to determine the k coefficients.

In another embodiment, there are only two measurement points selected for a particular measurement (e.g., length, profile), prohibiting the use of curve fitting based only on the three-dimensional coordinates of those two measurement points since three points are needed to determine $k_{0RS1}$, $k_{1RS1}$, and $k_{2RS1}$. In that case, the video inspection device 100 can identify a plurality of pixels proximate each of the pixels of the image corresponding to a plurality of points on the surface 210 proximate each of the measurement points, and determine the three-dimensional coordinates of those points, enabling curve fitting to determine a reference surface 250.

In one embodiment and as shown in FIG. 2, the video inspection device 100 can determine the three-dimensional coordinates in the first coordinate system of a plurality of frame points 260 ($x_{iF1}$, $y_{iF1}$, $z_{iF1}$) forming a frame 262 (e.g., a rectangle) on the reference surface 250 around the irregularity 204 and the measurement points 221, 222, 223, 224, which can be used later to display the location of the reference surface 250.

Once the reference surface 250 is determined, in the exemplary embodiment shown in FIG. 2, the video inspection device 100 can conduct a measurement (e.g., depth) of the irregularity 204 by determining the distance between the fourth measurement point 224 selected to be at the deepest point of the irregularity 204 and the reference surface 250. The accuracy of this depth measurement is determined by the accuracy in selecting the plurality of measurement points 221, 222, 223, 224 on the surface 210 of the viewed object 202. In many instances as discussed previously, the contour of the irregularity 204 in the image 200 is difficult to assess from the two-dimensional image and may be too small or otherwise insufficient to reliably locate the plurality of measurement points 221, 222, 223, 224. Accordingly, in many cases, an operator will want further detail in the area of the irregularity 204 to evaluate the accuracy of the location of these measurement points 221, 222, 223, 224. So while some video inspection devices 100 can provide a point cloud view of the full image 200, that view may not provide the required level of detail of the irregularity 204 as discussed previously. In order to provide a more meaningful view of the surface 210 in the area around the measurement points 221, 222, 223, 224 than offered by a point cloud view of the three-dimensional data of the entire image 200, the inventive method creates a subset of the three-dimensional data in the region of interest.

At step 340, the CPU 150 of the video inspection device 100 can establish a second coordinate system different from the first coordinate system. In one embodiment, the second coordinate system can be based on the reference surface 250 and the plurality of measurement points 221, 222, 223, and 224. The video inspection device 100 can assign the origin of the second coordinate system ($x_{O2}$, $y_{O2}$, $z_{O2}$)=(0, 0, 0) to be located proximate the average position 225 of the three-dimensional coordinates of points on the reference surface 250 corresponding to two or more of the plurality of measurement points 221, 222, 223, 224 on the surface 210 (e.g., by projecting the measurement points 221, 222, 223, and 224 onto the reference surface 250 and determining an average position 225 on the reference surface 250). In some cases, the three-dimensional coordinates of the points on the reference surface 250 corresponding to the measurement points 221, 222, 223 can be the same. However, in some circumstances, due to noise and/or small variations in the surface 210, the measurement points 221, 222, 223 do not fall exactly on the reference surface 250, and therefore have different coordinates.

When determining points on the reference surface 250 that correspond to measurement points 221, 222, 223, 224 on the surface 210, it is convenient to apply the concept of line directions, which convey the relative slopes of lines in the x, y, and z planes, and can be used to establish perpendicular or parallel lines. For a given line passing through two three-dimensional coordinates (x1, y1, z1) and (x2, y2, z2), the line directions (dx, dy, dz) may be defined as:

$$dx = x2 - x1 \quad (2)$$

$$dy = y2 - y1 \quad (3)$$

$$dz = z2 - z1 \quad (4)$$

Given a point on a line (x1, y1, z1) and the line's directions (dx, dy, dz), the line can be defined by:

$$\frac{(x-x1)}{dx} = \frac{(y-y1)}{dy} = \frac{(z-z1)}{dz} \quad (5)$$

Thus, given any one of an x, y, or z coordinate, the remaining two can be computed. Parallel lines have the same or linearly scaled line directions. Two lines having directions (dx1, dy1, dz1) and (dx2, dy2, dz2) are perpendicular if:

$$dx1 \cdot dx2 + dy1 \cdot dy2 + dz1 \cdot dz2 = 0 \quad (6)$$

The directions for all lines normal to a reference plane defined using equation (1) are given by:

$$dx_{RSN} = -k_{1RS} \quad (7)$$

$$dy_{RSN} = -k_{2RS} \quad (8)$$

$$dz_{RSN} = 1 \quad (9)$$

Based on equations (5) and (7) through (9), a line that is perpendicular to the reference surface 250 and passing through a surface point $(x_S, y_S, z_S)$ can be defined as:

$$\frac{x - x_S}{-k_{1RS}} = \frac{y - y_S}{-k_{2RS}} = z - z_S \quad (10)$$

In one embodiment, the coordinates of a point on the reference surface 250 $(x_{iRS1}, y_{iRS1}, z_{iRS1})$ corresponding to a point on the surface 210 $(x_{iS1}, y_{iS1}, z_{iS1})$ (e.g. three-dimensional coordinates in a first coordinate system of points on the reference surface 250 corresponding to the measurement points 221, 222, 223, 224), can be determined by defining a line normal to the reference surface 250 having directions given in (7)-(9) and passing through $(x_{iS1}, y_{iS1}, z_{iS1})$, and determining the coordinates of the intersection of that line with the reference surface 250. Thus, from equations (1) and (10):

$$z_{iRS} = \frac{(k_{1RS}^2 \cdot z_{iS1} + k_{1RS} \cdot x_{iS1} + k_{2RS}^2 \cdot z_{iS1} + k_{2RS} \cdot y_{iS1} + k_{ORS})}{(1 + k_{1RS}^2 + k_{2RS}^2)} \quad (11)$$

$$x_{iRS1} = k_{1RS1} \cdot (z_{iS1} - z_{iRS1}) + x_{iS1} \quad (12)$$

$$y_{iRS1} = k_{2RS} \cdot (z_{iS1} - z_{iRS1}) + y_{iS1} \quad (13)$$

In one embodiment, these steps (equations (2) through (13)) can be used to determine the three-dimensional coordinates of points on the reference surface 250 corresponding to the measurement points 221, 222, 223, 224. Then the average position 225 of these projected points of the measurement points on the reference surface 250 $(x_{M1avg}, y_{M1avg}, z_{M1avg})$ can be determined. The origin of the second coordinate system $(x_{O2}, y_{O2}, z_{O2}) = (0, 0, 0)$ can then be assigned and located proximate the average position 225 $(x_{M1avg}, y_{M1avg}, z_{M1avg})$.

Locating the origin of the second coordinate system proximate the average position 225 in the area of the irregularity 204 with the z values being the perpendicular distance from each surface point to the reference surface 250 allows a point cloud view rotation to be about the center of the area of the irregularity 204 and permits any depth map color scale to indicate the height or depth of a surface point from the reference surface 250.

In order to take advantage of this second coordinate system, at step 350, the CPU 150 of the video inspection device 100 transforms the three-dimensional coordinates in the first coordinate system $(x_{i1}, y_{i1}, z_{i1})$ determined for various points (e.g., the plurality of surface points, the plurality of measurement points 221, 222, 223, 224, the points on the reference surface 250 including the frame points 260, etc.) to three-dimensional coordinates in the second coordinate system $(x_{i2}, y_{i2}, z_{i2})$.

In one embodiment, a coordinate transformation matrix ([T]) can be used to transform the coordinates according to the following:

$$([x_{i1}y_{i1}z_{i1}] - [x_{M1avg}y_{M1avg}z_{M1avg}]) * [T] = [x_{i2}y_{i2}z_{i2}] \quad (14)$$

where [T] is a transformation matrix.

In non-matrix form, the three-dimensional coordinates in the second coordinate system can be determined by the following:

$$x_{i2} = (x_{i1} - x_{M1avg}) * T_{00} + (y_{i1} - y_{M1avg}) * T_{10} + (z_{i1} - z_{M1avg}) * T_{20} \quad (15)$$

$$y_{i2} = (x_{i1} - x_{M1avg}) * T_{01} + (y_{i1} - y_{M1avg}) * T_{11} + (z_{i1} - z_{M1avg}) * T_{21} \quad (16)$$

$$z_{i2} = (x_{i1} - x_{M1avg}) * T_{02} + (y_{i1} - y_{M1avg}) * T_{12} + (z_{i1} - z_{M1avg}) * T_{22} \quad (17)$$

where the transformation matrix values are the line direction values of the new x, y, and z axes in the first coordinate system.

At step 360, the CPU 150 of the video inspection device 100 determines a subset of the plurality of surface points that are within a region of interest on the surface 210 of the viewed object 202. In one embodiment, the region of interest can be a limited area on the surface 210 of the viewed object 202 surrounding the plurality of selected measurement points 221, 222, 223, 224 to minimize the amount of three-dimensional data to be used in a point cloud view. It will be understood that the step of determining of the subset 360 can take place before or after the transformation step 350. For example, if the determination of the subset at step 360 takes place after the transformation step 350, the video inspection device 100 may transform the coordinates for all surface points, including points that are outside the region of interest, before determining which of those points are in the region of interest. Alternatively, if the determination of the subset at step 360 takes place before the transformation step 350, the video inspection device 100 may only need to transform the coordinates for those surface points that are within the region of interest.

In one embodiment, the region of interest can be defined by determining the maximum distance ($d_{MAX}$) between each of the points on the reference surface 250 corresponding to the measurement points 221, 222, 223, 224 and the average position 225 of those points on the reference surface 250 (the origin of the second coordinate system $(x_{O2}, y_{O2}, z_{O2}) = (0, 0, 0)$ if done after the transformation, or $(x_{M1avg}, y_{M1avg}, z_{M1avg})$ in the first coordinate system if done before the transformation). In one embodiment, the region of interest can include all surface points that have corresponding points on the reference surface 250 (i.e., when projected onto the reference surface) that are within a certain threshold distance ($d_{ROI}$) of the average position 225 of the measurement points 221, 222, 223, 224 on the reference surface 250 (e.g., less than the maximum distance ($d_{ROI} = d_{MAX}$) or less than a distance slightly greater (e.g. twenty percent greater) than the maximum distance ($d_{ROI} = 1.2 * d_{MAX}$)). For example, if the average position 225 in the second coordinate system is at $(x_{O2}, y_{O2},$ $z_{O2}$)=(0, 0, 0), the distance (d) from that position to a point on the reference surface 250 corresponding to a surface point ($x_{iRS2}$, $y_{iRS2}$, $z_{iRS2}$) is given by:

$$d_{iRS2} = \sqrt{(x_{iRS2} - x_{O2})^2 + (y_{iRS2} - y_{O2})^2} \quad (18)$$

Similarly, if the average position 225 in the first coordinate system is at ($x_{M1avg}$, $y_{M1avg}$, $z_{M1avg}$), the distance (d) from that position to a point on the reference surface 250 corresponding to a surface point ($x_{iRS1}$, $y_{iRS1}$, $z_{iRS1}$) is given by:

$$d_{iRS1} = \sqrt{(x_{iRS1} - x_{M1avg})^2 + (y_{iRS1} - y_{M1avg})^2} \quad (19)$$

If a surface point has a distance value ($d_{iRS1}$ or $d_{iRS2}$) less than the region of interest threshold distance ($d_{ROI}$) and therefore in the region of interest, the video inspection device 100 can write the three-dimensional coordinates of that surface point and the pixel color corresponding to the depth of that surface point to a point cloud view file. In this exemplary embodiment, the region of interest is in the form of a cylinder that includes surface points falling within the radius of the cylinder. It will be understood that other shapes and methods for determining the region of interest can be used.

The region of interest can also be defined based upon the depth of the irregularity 204 on the surface 210 of the viewed object 202 determined by the video inspection device 100 in the first coordinate system. For example, if the depth of the irregularity 204 was measured to be 0.005 inches (0.127 mm), the region of interest can be defined to include only those points having distances from the reference surface 250 (or z dimensions) within a certain range (±0.015 inches (0.381 mm)) based on the distance of one or more of the measurement points 221, 222, 223, 224 to the reference surface 250. If a surface point has a depth value inside the region of interest, the video inspection device 100 can write the three-dimensional coordinates of that surface point and the pixel color corresponding to the depth of that surface point to a point cloud view file. If a surface point has a depth value outside of the region of interest, the video inspection device 100 may not include that surface point in a point cloud view file.

Figure 4:
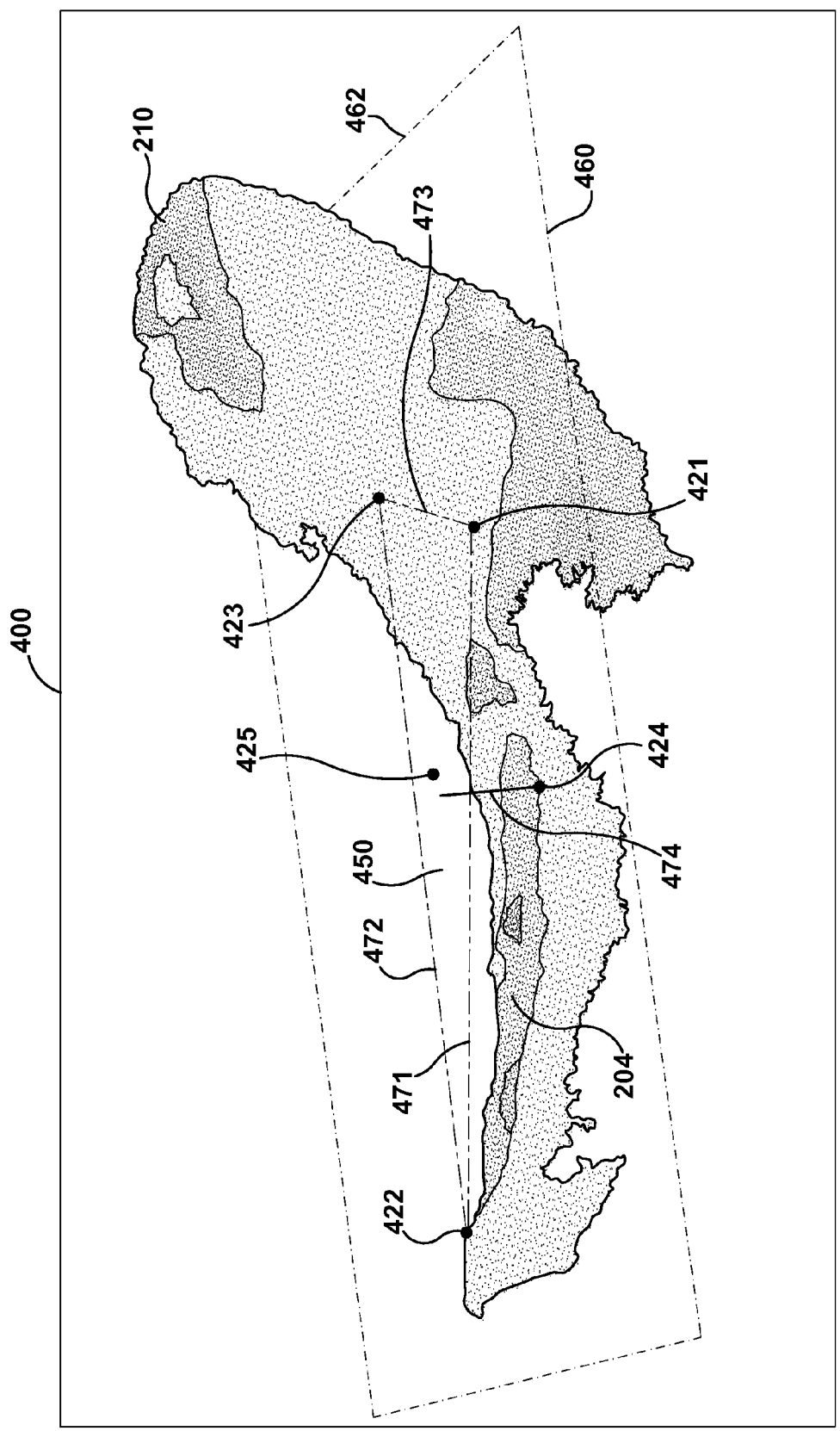
FIG. 4 is a display of a subset of a plurality of surface points in a point cloud view.

At step 370, and as shown in FIG. 4, the monitor 170, 172 of the video inspection device 100 can display a rendered three-dimensional view (e.g., a point cloud view) 400 of the subset of the plurality of surface points in the three-dimensional coordinates of the second coordinate system, having an origin 425 at the center of the view. In one embodiment (not shown), the display of the point cloud view 400 can include a color map to indicate the distance between each of the surface points and the reference surface 450 in the second coordinate system (e.g., a first point at a certain depth is shown in a shade of red corresponding that depth, a second point at a different depth is shown in a shade of green corresponding that depth). The displayed point cloud view 400 can also include the location of the plurality of measurement points 421, 422, 423, 424. To assist the operator in viewing the point cloud view 400, the video inspection device 100 can also determine three-dimensional line points 471, 472, 473 along straight lines between two or more of the plurality of measurement points 421, 422, 423 in the three-dimensional coordinates of the second coordinate system, and display those line points 471, 472, 473 in the point cloud view 400. The point cloud view 400 can also include a depth line 474 from the measurement point 424 intended to be located at the deepest point of the irregularity 204 to the reference surface 450. In one embodiment, the video inspection device 100 can determine if the depth line 474 exceeds a tolerance specification or other threshold and provide a visual or audible indication or alarm of such an occurrence.

The displayed point cloud view 400 can also include a plurality of frame points 460 forming a frame 462 on the reference surface 450 in the second coordinate system to indicate the location of the reference surface 450. In another embodiment, the displayed point cloud view 400 can also include a scale indicating the perpendicular distance from the reference surface 250.

As shown in FIG. 4, by limiting the data in the point cloud view 400 to those points in the region of interest and allowing the view to be rotated about a point 425 in the center of the region of interest (e.g., at the origin), the operator can more easily analyze the irregularity 204 and determine if the depth measurement and placement of the measurement points 421, 422, 423, 424 was accurate. In one embodiment, the operator can alter the location of one or more of the measurement points 421, 422, 423, 424 in the point cloud view 400 if correction is required. Alternatively, if correction is required, the operator can return to the two-dimensional image 200 of FIG. 2 and reselect one or more of the measurement points 221, 222, 223, 224, and repeat the process.

In another embodiment, the monitor 170, 172 of the video inspection device 100 can display a rendered three-dimensional view 400 of the subset of the plurality of surface points in the three-dimensional coordinates of the first coordinate system without ever conducting a transformation of coordinates. In this embodiment, the point cloud view 400 based on the original coordinates can also include the various features described above to assist the operator, including displaying a color map, the location of the plurality of measurement points, three-dimensional line points, depth lines, frames, or scales.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for displaying a three-dimensional view of a surface of a viewed object, the method comprising the steps of:
    determining three-dimensional coordinates in a first coordinate system of a plurality of surface points on the surface of the viewed object;
    receiving a selection of a plurality of measurement points on the surface of the viewed object;
    determining a reference surface based on the three-dimensional coordinates in the first coordinate system of three or more of the plurality of surface points proximate one or more of the plurality of measurement points;
    establishing a second coordinate system different from the first coordinate system based on the reference surface and the plurality of measurement points by assigning the origin of the second coordinate system to be located proximate the average position of the three-dimensional coordinates of points on the reference surface corresponding to two or more of the plurality of measurement points;

transforming the three-dimensional coordinates in the first coordinate system of the plurality of surface points to the three-dimensional coordinates in the second coordinate system;

determining a subset of the plurality of surface points that are within a region of interest on the surface of the viewed object, wherein the region of interest is based on the plurality of measurement points; and displaying, on a monitor, a rendered three-dimensional view of the subset of the plurality of surface points in the three-dimensional coordinates of the second coordinate system, wherein displaying the rendered three-dimensional view of the subset of the plurality of surface points further comprises displaying a measured geometric dimension of the region of interest, and wherein the measured geometric dimension comprises depth of an irregularity on the surface of the viewed object.

2. The method of claim 1, further including obtaining and displaying a two-dimensional image of the surface of the viewed object.

3. The method of claim 1, further including obtaining and displaying an image of the surface of the viewed object, wherein the step of receiving the selection of the plurality of measurement points comprises receiving, via a pointing device, inputs indicating locations of plurality of cursors on the displayed image.

4. The method of claim 1, wherein the reference surface is a plane.

5. The method of claim 1, wherein the region of interest includes surface points within a certain distance from the origin of the second coordinate system.

6. The method of claim 1, wherein the region of interest includes surface points within a certain distance from the average position.

7. The method of claim 1, wherein the region of interest includes surface points having a distance from the reference surface within a certain range based on the distance from one or more of the measurement points and the reference surface.

8. The method of claim 1, wherein the step of displaying the rendered three-dimensional view of the subset of the plurality of surface points comprises displaying a point cloud view of the subset of the plurality of surface points.

9. The method of claim 1, wherein rotation of the rendered three-dimensional view is about the origin of the second coordinate system.

10. The method of claim 1, wherein the step of displaying the rendered three-dimensional view of the subset of the plurality of surface points in the three-dimensional coordinates of the second coordinate system comprises using a color map to indicate the distance between the subset of the plurality of surface points and the reference surface.

11. The method of claim 1, wherein the rendered three-dimensional view further comprises a scale indicating perpendicular distance from the reference surface.

12. The method of claim 1, further comprising the step of displaying the plurality of measurement points in the rendered three-dimensional view.

13. The method of claim 1, wherein the step of transforming the three-dimensional coordinates in the first coordinate system of the plurality of surface points to the three-dimensional coordinates in a second coordinate system takes place after the step of determining a subset of the plurality of surface points that are within a region of interest on the surface of the viewed object, wherein only the subset of the plurality of surface points are transformed.

14. The method of claim 1, further comprising the steps of: determining three-dimensional line points along straight lines between two or more of the plurality of measurement points in the three-dimensional coordinates of the second coordinate system; and displaying the three-dimensional line points in the rendered three-dimensional view.

15. The method of claim 1, further comprising the step of displaying in the rendered three-dimensional view a depth line from a measurement point to the reference surface.

16. The method of claim 1, further comprising the step of displaying a plurality of frame points in the rendered three-dimensional view forming a frame on the reference surface to indicate the location of the reference surface.

17. A device for displaying a three-dimensional view of a surface of a viewed object comprising:

an imager for obtaining an image of the surface of the viewed object;

a monitor for displaying the image of the surface of the viewed object;

a pointing device for selecting a plurality of measurement points on the displayed image of the surface of the viewed object; and a central processor unit for determining three-dimensional coordinates in a first coordinate system of a plurality of surface points on the surface of the viewed object using the obtained image of the surface of the viewed object;

determining a reference surface based on the three-dimensional coordinates in the first coordinate system of three or more of the plurality of surface points proximate one or more of the plurality of measurement points;

establishing a second coordinate system different from the first coordinate system based on the reference surface and the plurality of measurement points by assigning the origin of the second coordinate system to be located proximate the average position of the three-dimensional coordinates of points on the reference surface corresponding to two or more of the plurality of measurement points;

transforming the three-dimensional coordinates in the first coordinate system of the plurality of surface points to the three-dimensional coordinates in the second coordinate system; and determining a subset of the plurality of surface points that are within a region of interest on the surface of the viewed object, wherein the region of interest is based on the plurality of measurement points; and displaying a rendered three-dimensional view of the subset of the plurality of surface points in the three-dimensional coordinates of the second coordinate system, wherein displaying the rendered three-dimensional view of the subset of the plurality of surface points further comprises displaying a measured geometric dimension of the region of interest, and wherein the measured geometric dimension comprises depth of an irregularity on the surface of the viewed object.

* * * * *